United States Patent Office 3,341,488
Patented Sept. 12, 1967

3,341,488
RELEASE OF AGENTS FROM ADSORBATE-CONTAINING MOLECULAR SIEVES
Francis M. O'Connor, Kenmore, N.Y., assignor to Union Carbide Corporation, a corporation of New York
No Drawing. Filed Sept. 29, 1961, Ser. No. 141,589
15 Claims. (Cl. 260—37)

This invention relates to the improved release of materials such as active chemicals contained in the inner adsorption region of crystalline zeolitic molecular sieves. The active chemicals are released in a reaction zone where they may, for example, serve as curing agents for rubber formulations, epoxy resins or as catalysts for the formation of polyurethane foams.

It would be desirable to prepare mixtures such as epoxy, rubber, or methane formulations which cure sufficiently rapidly at the desired elevated temperature, and yet provide acceptable pot life to permit packaging and storage until needed. The prior art has been unable to provide mixtures having both characteristics, and consequently employed the so-called "two-package" systems. One package contains the formulation and the other contains the curing accelerator. When the formulation is to be applied, the two packages are intimately mixed and the resulting mixture must be heated and used immediately as the pot life is very short due to the curing accelerator. It will be immediately apparent that there are several important disadvantages such as, (1) the necessity for two packages, (2) mixing equipment and time, and (3) short pot life of the resulting mixture.

It is known that materials such as active chemicals may be adsorbed or loaded in crystalline zeolitic molecular sieves, stored in this form, and subsequently released from the molecular sieve by, for example, displacement or heat. The release may be in a reaction zone whereupon the active chemical enters into a reaction with another constituent in such zone. One advantage of chemical-loaded molecular sieves over the conventional introduction of active chemicals in the reaction zone is that of controlling the reaction temperature and rate. For example, in the curing of natural and synthetic rubbers and epoxy resins, it is extremely difficult to avoid premature cure or scorch at temperatures below the desired reaction or curing temperature. Also, certain volatile active chemicals may escape from the curable material prior to curing, and present problems due to their explosive, flammable, or toxic nature. Ideally the active chemical or accelerator should not become active during the various stages of processing such as milling, extruding and molding, that is, a long scorch time is desirable. However, the active chemical should be available at the higher curing temperature, that is, short cure time. Molecular sieves provide a means for holding the active chemical intact during the preliminary processing stages at relatively low temperatures, and releasing such material at a desirably relatively high temperature for participation in a reaction.

It has often been difficult to thermally desorb active chemicals from chemical-loaded molecular sieves at the optimum reaction temperature. In certain cases therefore, products which provide marked improvement in processing safety of rubber formulations and extended pot life in plastics recipes are not acceptable because of failure to give increased cure rate.

It is known that active chemicals may be released from molecular sieves by the introduction of water into the reaction zone, but such introduction can only be made at or near the desired temperature of release. This requires a separate water stream, and the active chemical release temperature is virtually impossible to control, probably due to the time lag between water introduction and intimate contact with molecular sieve's inner adsorption region.

An object of this invention is to provide an improved system for obtaining effective release of adsorbed materials from molecular sieves.

Another object is to provide a system for releasing adsorbed active chemicals from molecular sieves at predetermined elevated temperatures.

A further object is to provide a system for releasing adsorbed active chemicals from molecular sieves at predetermined elevated temperatures, and without the necessity of a separate stream of water.

An additional object of this invention is to provide a curable one-package formulation containing a chemical-loaded crystalline zeolitic molecular sieve composition which will release an adsorbed active chemical at a predetermined, adjustable temperature, cure at a satisfactory rate, and yet has sufficiently long pot life to permit storage for extended periods prior to use.

Other objects and advantages of the invention will be apparent from a reading of ensuing disclosure and claims.

It has been discovered that the aforementioned problems may be overcome and the objects realized by adsorbing a material in the inner adsorption region of the molecular sieve, and employing a water source to release the adsorbate at a predetermined, adjustable elevated temperature, i.e., the release temperature. The expression "desorption temperature of said active chemical" as used herein refers to the temperature at which a substantial portion of the active chemical would be desorbed from the molecular sieve at atmospheric pressure if no water were available. The adsorbate release temperature will always be lower than this desorption temperature.

One embodiment of the invention contemplates a process for conducting a controlled reaction in a reaction zone comprising the steps of adsorbing an active chemical in the inner adsorption region of a crystalline zeolitic molecular sieve, and providing a first reactant and a water source in the reaction zone. The water is capable of being liberated from the source at elevated temperatures below the desorption temperature of the active chemical. The active chemical-containing molecular sieve is introduced in the reaction zone. The latter is then heated to the elevated temperature thereby liberating the water which in turn releases the active chemical from the inner adsorption region of the molecular sieve. The released active chemical reacts with the first reactant in the reaction zone. The heating may be provided by an external source, or generated internally if the reaction is of an exothermic nature.

As used herein, the expression "active chemical" refers to any agent which is significantly adsorbable by crystalline zeolitic molecular sieves and which either enters into a chemical reaction or affects the rate at which the reaction occurs. The expression "adsorbed material" refers to any agent which is significantly adsorbable by molecular sieves but is not necessarily an active chemical, as for example, aromatic perfumes and food aromas such as the coffee flavor. Substances having a critical temperature below 25° C. are not significantly adsorbable at ambient conditions. Also, substances not having a significant vapor pressure, i.e., a few millimeters of mercury, at a temperature of about 600° C. would not be suitable as the adsorbate material.

Many sources of water may be used in the practice of this invention, the criteria being a material which will liberate water at an elevated temperature which is below the normal desorption temperature of the active chemical from the molecular sieve, absent the water. The following are exemplifications of suitable water sources, but the listing is of course not all-inclusive:

(1) Hydrated salts which dehydrate at a given temperature, as for example, $CaSO_4 \cdot 2H_2O$, $Na_2B_4O_7 \cdot 10H_2O$, and $CH_3COONa \cdot 3H_2O$.

(2) Water-loaded adsorbents such as crystalline zeolitic molecular sieves, silica gel, activated alumina, amorphous zeolites, high surface area silicas, clays and the like.

(3) Amino acids or hydroxyl-containing amides release water to form lactams:

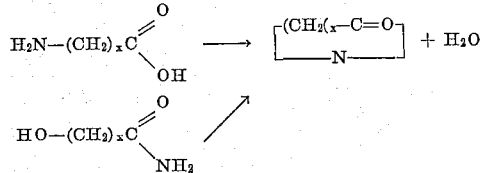

where $x = 3$ to $10$.

(4) Hydroxyl-containing organic acids release water to form the corresponding lactone:

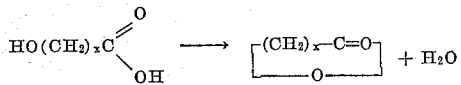

wherein $x = 3$ to $10$.

(5) Silica powders containing residual Si—OH can serve as a water source by condensation with Si—OH groups in silicone monomers or polymers to form water, for example, $R_2Si(OH)_2$, $RSi(OH)_3$, $R_3SiOH$ and hydroxyl end-blocked polymers. A specific illustration is $SiOH[(CH_2)_2SiO]_yH$, where $y = 3$ to $45$.

(6) Condensation of silicone monomers or polymers containing SiOH, as for example, diphenylsilane diol.

Water may be more or less strongly adsorbed than the active chemical, depending on the nature of the latter. It is postulated that when more than one adsorbable compound is present and the water release agent is the more strongly adsorbed material, the latter takes up the most active adsorption sites within the inner region of the molecular sieve and hence, the less strongly adsorbed active chemical is displaced from the molecular sieve. Even if the water release agent is equivalently or less strongly adsorbed than the active chemical, it will still affect desorption of the active chemical. This is because adsorption is a dynamic phenomenon, and the release agent will occupy adsorption sites which would normally be occupied by the active chemical if the release agent were not present. There also may be an interaction between the active chemical and the water in the adsorbed phase, which decreases the strength of forces holding the active chemical with the crystalline zeolite structure.

The term "zeolite," in general, refers to a group of naturally occurring and synthetic hydrated metal aluminosilicates, many of which are crystalline in structure. There are, however, significant differences between the various synthetic and natural materials in chemical composition, crystal structure and physical properties such as X-ray powder diffraction patterns.

The structure of crystalline zeolitic molecular sieves may be described as an open three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si) = 2$. The negative electrovalence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off at least a portion of the water of hydration. The space remaining in the crystals after activation is available for adsorption of adsorbate molecules having a size, shape and energy which permits entry of the adsorbate molecules into the pores of the molecular sieves.

The zeolites occur as agglomerates of fine crystals or are synthesized as fine powders and are preferably tableted or pelletized for large scale adsorption uses. Pelletizing methods are known which are very satisfactory because the sorptive character of the zeolite, both with regard to selectivity and capacity, remains essentially unchanged.

Any type of crystalline zeolitic molecular sieve may be employed in the present composition of matter and process, according to this invention. The selection of the particular sieve to be used will depend on factors such as the maximum critical dimension of the material to be adsorbed, the apparent pore size of the molecular sieve, and the nature of the reaction within the reaction zone. For example, the pores must be at least large enough to receive the desired adsorbate molecules.

The term "apparent pore size," as used herein, may be defined as the maximum critical dimension of the molecular species which is adsorbed by the zeolitic molecular sieve in question under normal conditions. The apparent pore size will always be larger than the effective pore diameter, which may be defined as the free diameter of the appropriate silicate ring in the zeolite structure.

Among the naturally occurring crystalline zeolitic molecular sieves are chabazite, erionite, faujasite, analcite, clinoptilolite and mordenite. The natural materials are adequately described in the chemical art. Synthetic zeolitic molecular sieves include zeolites A, D, R, T, X, Y and L. Zeolites such as types X, Y, L and faujasite are particularly useful because of their relatively large pore sizes.

Zeolite A is a crystalline zeolitic molecular sieve which may be represented by the formula:

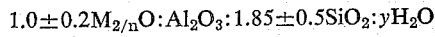

wherein M represents a metal, $n$ is the valance of M, and $y$ may have any value up to about 6. The as-synthesized zeolite A contains primarily sodium ions and is designated sodium zeolite A. Zeolite A is described in more detail in U.S. Patent No. 2,882,243, issued Apr. 14, 1959.

Zeolite T is a synthetic crystalline zeolite molecular sieve whose composition may be expressed in terms of oxide mole ratios as follows:

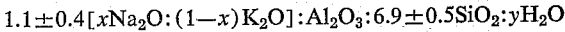

wherein $x$ is any value from about 0.1 to about 0.8 and $y$ is any value from about zero to about 8. Further characterization of zeolite T by means of X-ray diffraction techniques is described in U.S. Patent No. 2,950,952, issued Aug. 30, 1960.

Zeolite X is a synthetic crystalline zeolitic molecular sieve which may be represented by the formula:

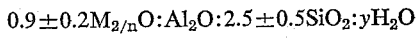

wherein M represents a metal, particularly alkali and alkaline earth metals, $n$ is the valance of M, and $y$ may have any value up to about 8 depending on the identity of M and the degree of hydration of the crystalline zeolite. Sodium zeolite X has an apparent pore size of about 10 Angstrom units. Zeolite X, its X-ray diffraction pattern, its properties, and methods for its preparation are described in detail in U.S. Patent No. 2,882,244, issued Apr. 14, 1959.

Zeolite Y is described and claimed in U.S. patent application Ser. No. 109,487, filed May 12, 1961 in the name of D. W. Breck.

Zeolite L is described and claimed in U.S. patent application Ser. No. 122,398, filed July 7, 1961 in the names of D. W. Breck and N. A. Acara.

Zeolite D is described and claimed in U.S. patent application Ser. No. 680,381, filed Aug. 26, 1957 in the name of R. M. Milton.

Several methods may be employed for introducing the active chemical to the inner adsorption region of the molecular sieve. For example, when the active chemical has an appreciable vapor pressure, the material may be introduced by vapor phase adsorption by enclosure in a container with a molecular sieve and transfer thereto by vapor phase. The adsorption rate may be increased by heating the container.

If the material does not possess appreciable vapor pressure, it may be adsorbed by the molecular sieve from a liquid solution wherein the solvent is not adsorbed. If the material is a solid, it may be adsorbed by intimate mixing or blending with the molecular sieve. Again, heating either during or after blending accelerates the adsorption.

The present invention may be employed for the curing of various types of rubber formulations. The adsorbed active chemical which in this embodiment is a curing agent, may be sulfur, a peroxide such as dicumyl peroxide, a polyamine such as triethylenetetramine and other suitable crosslinking agents. An adsorbed accelerator may be the "primary" type which actually catalyzes the formation of sulfur radicals or the "secondary" type (commonly called "activator") which increases the activity of the primary accelerator. Alternatively, the adsorbed active chemical may be a combination of primary and secondary type accelerators.

The rubber formulation may, for example, be the neoprene type, which is the generic term applied to the group of synthetic elastomers based on the polymers of chloroprene, that is, 2-chlorobutadiene-1,3. Two particularly important classes of polychloroprene polymers are designated Type G neoprenes and Type W neoprenes. Type G neoprenes are sulfur-modified chloroprene-based synthetic elastomers and Type W neoprenes are stabilized non-sulfur modified chloroprene-based synthetic elastomers. Suitable neoprene accelerators include, dihydroxy benzenes, such as pyrocatechol and resorcinol; alkyl-substituted dihydroxy benzenes such as ethyl catechol and ethyl resorcinol; and hydroxy-substituted benzoic acids, such as salicyclic acid and p-hydroxy benzoic acid. Other neoprene accelerators are well known to the art, and a more complete listing can be found in copending application Ser. No. 728,515, filed Apr. 15, 1958 in the name of F. M. O'Connor. The disclosure of this application is incorporated herein to the extent pertinent.

The rubber formulation may also be the butyl type made by copolymerizing an isoolefin, usually isobutylene, with a minor proportion of a multi-olefinic unsaturate having from 4 to 14 carbon atoms per molecule. The isoolefins used generally have from 4 to 7 carbon atoms, and such isomonoolefins as isobutylene or ethylmethylethylene are preferred. The multi-olefinic unsaturate usually is an aliphatic conjugated diolefin having from 4 to 6 carbon atoms, and is preferably isoprene or butadiene. Suitable accelerators for butyl rubber curing include strong acids such as HCl, HBr, HI and other halogen-substituted organic acids. Other suitable accelerators are unsaturated organic halides as 1,4-dichlorobutene, 2-chloropropene, 2-bromopropene and 2-iodopropene; also acyl halides such as benzoyl chloride; and alkyl benzenes such as alpha-alphaalpha trichlorotoluene. The incorporation of curing accelerators in molecular sieves for butyl rubber curing is described more completely in co-pending application Ser. No. 806,213, filed Apr. 14, 1959, in the names of F. M. O'Connor et al. The disclosure of this application is incorporated herein to the extent pertinent.

The present invention may also be employed for the curing of other rubber formulations, as for example the Buna or SBR type. Buna rubber comprises about 75% butadiene, styrene being the other main constituent. Suitable well-known accelerators for Buna rubber include thiurams, acylamines, alkylarylamines and thioureas. Specific examples are piperidine, diethylamine, and di-n-butylamine.

Other natural and synthetic resins may be cured by this process, as for example the epoxy type containing at least one of the following reactive group in their molecule:

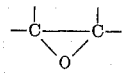

The epoxy resins may be saturated or unsaturated, aliphatic, cycloaliphatic, aromatic or heterocyclic and may be substituted with non-interfering substituents. The epoxy may be either present as a terminal or interior group. The incorporation of accelerators in molecular sieves for the curing of epoxy resins is described more completely in copending application Ser. No. 698,359, filed Nov. 25, 1957 in the name of W. G. Colclough, Jr. The disclosure of this application is incorporated herein to the extent pertinent.

Illustrative of the monomeric type epoxy resins are the following: vinylcyclohexanedioxide, epoxidized soybean oil, butadiene dioxide, 1,4-bis(epoxypropoxy)benzene, 1,3 - bis(2,3 - epoxypropoxy)cyclohexane, 4,4 - bis(2-hydroxy-3,4-epoxybutoxy)diphenyldimethylmethane, 1,3-bis 4,5 - epoxypentoxy)5 - chlorobenzene, 1,4-bis(3,4-epoxybutoxy) - 2 - chlorocyclohexane, 1,3-bis(2-hydroxy-3,4-epoxybutoxy)benzene, 1,4-bis(2-hydroxy-4,5-epoxypentoxy)benzene, 1,2,5,6-diepoxy-3-hexane, 1,2,5,6-diepoxyhexane and 1,2,3,4-tetra(2-hydroxy - 3,4 - epoxybutoxy) butane. Other compounds of this type include the glycidyl polyethers of polyhydric phenols obtained by reacting mixtures containing a molar amount of a polyhydric phenol with a stoichiometric excess, i.e., 3 to 6 moles per each phenolic hydroxyl group, of an epihalohydrin in an alkaline medium, and also polyglycidyl esters, such as are prepared by reacting an epihalohydrin with a salt of a polybasic acid.

Examples of the polymeric type epoxy resins include the glycidyl polyethers of polyhydric phenols obtained by reacting, preferably in an alkaline medium, a polyhydric phenol and 1-2 moles of an epihalohydrin per each phenolic hydroxyl group. Illustrative of this particular type compound is the polyether obtained in reacting 1 mole of bis(4-hydroxyphenyl)dimethylmethane with 1.5 moles of epichlorohydrin in the presence of an alkaline catalyst.

Among the active agents suitable for curing the epoxy compositions are compounds containing reactive hydrogen, such as diethylamine, butylamine, N-methylaniline, phenylene diamine, 4,4'-methylene dianiline, N(2-hydroxy-2,3,3-trimethylpentyl)-diethylene triamine, metaxylylene diamine; polyhydric phenols such as 2,2-bis(p-hydroxyphenyl)propane, novolak resins, and acid anhydrides such as hexahydrophthalic acid anhydride, chlorendic anhydride and methylnadic anhydride. These compounds, called hardeners, may be used singly or in combinations of two or more.

The epoxy compositions are of particular value as casting resins, potting compounds, and adhesive binders. These compositions also find use as laminating resins, surface coatings or finishes, and as molding compositions.

The instant process and composition of matter may be used in the preparation of synthetic urethane products useful as coatings, sealants, foams, elastomers, adhesives, molding powders and the like, using reactions involving compounds possessing reactive hydrogens with organic compounds containing reactive groups of the formula, —N=C=G, in which G represents oxygen or sulfur. The reactive hydrogen-containing compound may be adsorbed on the molecular sieve as the active chemical or it may be added directly to the formulation as a separate constituent. Urethane polymers formed by reactions of organic isocyanate such as di- or polyisocyanates or di- or polyisothiocyanates with active hydrogen-containing compounds, e.g., polyols, polyesters, polyesteramides, polyamides, water, polyalkylene ether glycols and the like, are readily foamed by internal development of carbon dioxide or by means of a blowing agent which vaporizes at or below the temperature of the foaming mass. Suitable catalysts include tertiary amines, organic tin compounds such as dibutyl tin dilaurate, tributyl tin acetate, tetrabutyl tin, and butyl tin trichloride. Active hydrogen compounds which may be used include N-methyldiethanolamine, ethylene glycol and diethylenetriamine.

The instant process and composition of matter may be broadly described as follows: The active chemical, which for example may be an epoxy resin curing agent or a rubber curing accelerator, is adsorbed in the inner adsorption region of a crystalline zeolitic molecular sieve, and the active chemical-containing molecular sieve is intimately mixed with the desired first reactant, such as a curable epoxy resin or rubber formulation at ambient temperature. The water source may also be intimately mixed with the other components at this point. The resulting mixture is stable at ambient temperature and has a long pot life since the active chemical is so tightly held within the molecular sieve inner adsorption region as to be effectively separated from the formulation. Also, water is not released from the water source at ambient temperature, so that the mixture provides a "one-package" system as contrasted with the two-package systems employed by the prior art.

When the product is needed, the water source is introduced if not done previously, and the mixture heated to the desired reaction temperature. This temperature is above the liberation temperature of the water from the water source, and the liberated water in turn releases the active chemical. The latter reacts with the first reactant at the elevated reaction temperature.

The invention will be more clearly understood by the ensuing exemplifications of the novel process and composition of matter.

*Example I*

2-mercaptoimidazoline is well-known as an effective accelerator for neoprene Type W formulations as shown in Table I, recipes 1, 2 and 3. As the concentration of this accelerator is increased, the Mooney scorch time decreases and the rate of cure increases. Even at low concentrations of 0.1 phr. (parts per hundred parts of rubber), the aforementioned accelerator does not provide good processing safety, since a Mooney scorch time of below 15 minutes is considered to be unsafe.

The "Mooney Scorch" data reported herein was obtained by the ASTM test method D–1077–55T entitled "Curing Characteristics of Vulcanizable Rubber Mixtures During Heating by the Shearing Disc Viscometer." This test method is described on pages 591–592 in a bulletin published May 1956 by the American Society for Testing Materials, entitled "ASTM Standards on Rubber Products." The scorch time in this test is the time in minutes for a 5 unit rise in viscosity from the minimum value.

2-mercaptoimidazoline was introduced to the inner adsorption region of zeolite X by blending the two materials, and four samples each containing 20% by weight of this active chemical were used in recipes 4–7. It can be seen in the recipe 4 test that the active chemical-loaded zeolite X provided excellent processing safety in neoprene Type W rubber formulations. The addition of $CaSO_4 \cdot 2H_2O$ to formulations containing accelerator-loaded zeolite X provides a considerable increase in rate of cure while still maintaining adequate processing safety. The $CaSO_4 \cdot 2H_2O$ was dehydrated at about 250–300° F. and the resulting moisture adsorbed in the zeolite X, thereby releasing the curing accelerator.

Recipes 4–6 show the effect of varying concentration of $CaSO_4 \cdot 2H_2O$. As the ratio of $CaSO_4 \cdot 2H_2O$ to 2-mercaptoimidazoline loaded zeolite X is increased, the Mooney scorch time at 250° F. decreases and the rate of cure increases slightly as shown by comparison of recipes 5 and 6. If the ratio of $CaSO_4 \cdot 2H_2O$ to accelerator-loaded zeolite X is decreased as in recipe 7, the Mooney scorch time is increased and the rate of cure decreased. The proper ratio of accelerator-loaded molecular sieve and water available to effect release provides a method for obtaining an optimum balance of processing and curing characteristics.

A well-cured Neoprene–W compound of the type shown in Table I should have an ultimate tensile strength in the range of 3000 p.s.i., so that the recipe 5–7 formulations were entirely satisfactory in this respect. Recipe 4 which contained no water source failed to provide satisfactory tensile strength. Similarly, it is apparent that the stress at 300% elongation for recipes 5–7 is of the same order of magnitude as recipes 1–3.

This example illustrates the utility of a stable mixture comprising a non-sulfur modified polychloroprene-based elastomer formulation, a crystalline zeolitic molecular sieve containing within its inner adsorption region, a curing accelerator for the elastomer, and $CaSO_4 \cdot 2H_2O$.

TABLE I

| Compound | Recipe (Parts per Hundred Parts of Rubber) | | | | | | |
|---|---|---|---|---|---|---|---|
| Neoprene W Masterbatch | 132.0 | | | | | | |
| Zinc oxide | 5.0 | | | | | | |
| Stearic acid | 0.5 | | | | | | |
| Magnesium oxide | 2.0 | | | | | | |
| | 1 | 2 | 3 | 4 | 5 | 6 | 7 |
| 2-mercaptoimidazoline (Act. Chem.) | 0.1 | 0.3 | 0.5 | | | | |
| 20% Act. Chem.-80% zeolite X | | | | 2.5 | 2.5 | 2.5 | 3.0 |
| $CaSO_4 \cdot 2H_2O$ [a] | | | | | 0.65 | 1.0 | 0.65 |
| Mooney Scorch (MS) (Minutes to 5 Point Rise)—250° F | 11.7 | 9.7 | 8.2 | 27 | 19.5 | 16.0 | 20.2 |
| Stress at 300% Elongation (p.s.i.)—Minutes at 307° F.: | | | | | | | |
| 5 | 555 | 690 | 1,140 | | 1,035 | 1,050 | 990 |
| 7 | 860 | 970 | 1,450 | No cure | 1,260 | 1,282 | 1,215 |
| 10 | 950 | 1,165 | 1,480 | 700 | | | |
| Ultimate Tensile (p.s.i.)—Minutes at 307° F.: | | | | | | | |
| 5 | 2,275 | 2,520 | 3,220 | | 2,800 | 2,850 | 2,750 |
| 7 | 2,530 | 3,050 | 3,335 | No cure | 3,200 | 3,380 | 3,140 |
| 10 | 3,000 | 3,540 | 3,550 | 2,050 | | | |
| Ultimate Elongation (p.s.i.)—Minutes at 307° F.: | | | | | | | |
| 5 | 800 | 750 | 750 | | 780 | 760 | 760 |
| 7 | 700 | 750 | 640 | No cure | 730 | 690 | 740 |
| 10 | 760 | 750 | 570 | 710 | | | |

[a] —15.7% water available below 325 °F.

*Example II*

Dibutyl tin dilaurate is an extremely active catalyst for the preparation of rigid polyurethane foams, giving good properties. The foam initiation time provided by this catalyst is very short, however, see Table II, recipe 1, and for many end uses a longer period before foaming starts is required. The use of heat treated dibutyl tin dilaurate-loaded zeolite X provides a long foam initiation time, but gives a very poor foam as shown in recipe 2.

The addition of water to the formulation as in recipe 3, give a good foam but also decreases the foam initiation time to the same level as was obtained with dibutyl tin dilaurate alone. This shows the displacing effect of water which releases the catalyst prematurely. The use of water-loaded zeolite X as shown in recipes 4, 5 and 6 gives excellent foam properties while still providing extended foam initiation time. The foam initiation time is longer at lower water-loaded zeolite X concentrations, while superior foam properties are obtained at higher water-loaded zeolite X concentrations. The proper concentration of catalyst-loaded and water-loaded molecular sieves provides an optimum balance between foam initiation time and foam properties for any particular application. This type of system results in a formulation with a high degree of versatility. It should be noted that in this example, the foam generation reaction is of an exothermic nature, and external heat is not needed to release the water.

This example illustrates utility of a stable mixture comprising a urethane formulation comprising an organic compound containing a reactive —N=C=G group in which G is a member selected from the group consisting of oxygen and sulfur, and a substance having reactive hydrogen; a crystalline zeolitic molecular sieve containing a urethane reaction catalyst in its inner adsorption region; and a crystalline zeolitic molecular sieve containing water adsorbate.

sired curing temperature. Referring now to Table III, recipe 1 is the control sample in which sulfur is introduced in its elemental form. In recipe 2, the sulfur is added as sulfur-loaded zeolite X, and the recipe failed to cure even at elevated temperature. In recipe 3, the dehydrated salt $CaSO_4 \cdot 2H_2O$ which releases its water of dehydration at 250° F. was added, and this recipe developed a good state of cure essentially equivalent to recipe 1 after 10 minutes at 307° F. The Mooney scorch at 250° F. of recipe 3 is still four times longer than recipe 1, however, indicating that sulfur is released much more slowly at this lower temperature than at the vulcanization temperature of 307° F. In recipe 4, less $CaSO_4 \cdot 2H_2O$ was used and a longer Mooney scorch was obtained. The curing characteristics of this recipe, however, indicated that insufficient water was present to effectively release the sulfur from the molecular sieve. By selecting a proper balance between active chemical-loaded molecular sieve and water source, the optimum in cure rate and scorch protection can be obtained.

This example illustrates the utility of a stable mixture comprising a butadiene-styrene rubber formulation, a crystalline zeolitic molecular sieve containing a buta-

TABLE II

| Ingredients | Recipe in Grams |
|---|---|
| Acrolein propylene oxide and glycerol propylene oxide | 25.000 |
| 1,2,6-hexanetriol | 2.390 |
| Trichloromonofluoromethane (blowing agent) | 11.000 |
| Siloxane oxyalkylene copolymer (surfactant) | 0.275 |
| Quasi-Prepolymer | 34.000 |
| | 72.665 |

| | 1 | 2 | 3 | 4 | 5 | 6 |
|---|---|---|---|---|---|---|
| Dibutyl Tin Dilaurate (DTD) | 0.205 | | | | | |
| 20% DTD-80% Zeolite X | | 1.03 | 1.03 | 1.03 | 1.03 | 1.03 |
| $H_2O$ | 0.3 | | 0.6 | | | |
| 28% $H_2O$-72% Zeolite X | | | | 2.06 | 1.03 | 0.51 |
| Foam Initiation Time (Sec.) | 45 | 210 | 35 | 90 | 120 | 135 |
| Foam Rise Time (Min.) | 2.5 | 10 | 9 | 4.5 | 6 | 5.5 |
| Foam Height (In.) | 11.25 | 6.75 | 11 | 12 | 9.5 | 8.75 |
| Density, lb./ft.³ | 2.13 | | 2.1 | 1.93 | 2.13 | 2.28 |
| | Excellent | Poor | Excellent | Excellent | Excellent | Excellent |

*Example III*

Elemental sulfur is an effective curing accelerator in SBR rubber formulations. However, sulfur-loaded molecular sieve has been found to retain its absorbed sulfur even at elevated temperatures, and the present invention may be used to effectively release sulfur at the dediene-styrene curing accelerator in its inner adsorption region, and $CaSO_4 \cdot 2H_2O$.

TABLE III

| | Recipe (Parts Per Hundred Parts of Rubber) | | | | | | | | | | | |
|---|---|---|---|---|---|---|---|---|---|---|---|---|
| | 1 | | | 2 | | | 3 | | | 4 | | |
| SBR rubber-carbon black masterbatch | 150 | | | 150 | | | 150 | | | 150 | | |
| Zinc Oxide | 5.0 | | | 5.0 | | | 5.0 | | | 5.0 | | |
| Stearic Acid | 2.0 | | | 2.0 | | | 2.0 | | | 2.0 | | |
| Sulfur | 2.0 | | | | | | | | | | | |
| 20% Sulfur-80% Zeolite X | | | | 10.0 | | | 10.0 | | | 10.0 | | |
| Piperidinium pentamethylene dithiocarbonate | 1.0 | | | 1.0 | | | 1.0 | | | 1.0 | | |
| $CaSO_4 \cdot 2H_2O$ | | | | | | | 10.0 | | | 5.0 | | |

| | Minutes to 5 Point Rise | | | | | | | | | | | |
|---|---|---|---|---|---|---|---|---|---|---|---|---|
| Mooney Scorch (MS), 250° F | 6 | | | 84 | | | 25 | | | 41 | | |

| Press Cure: | S | T | E | S | T | E | S | T | E | S | T | E |
|---|---|---|---|---|---|---|---|---|---|---|---|---|
| Minutes at 307° F.: | | | | | | | | | | | | |
| 5 | 3,050 | 3,050 | 300 | No Cure | | | 1,835 | 2,700 | 425 | 186 | 186 | 500 |
| 10 | | 3,015 | 265 | No Cure | | | 2,554 | 2,995 | 350 | 753 | 1,150 | 450 |
| Minutes at 320° F.: 2 | 3,437 | 3,841 | 360 | No Cure | | | 884 | 1,455 | 850 | No Cure | | |

S=Stress at 300% Elongation (p.s.i.).
T=Ultimate Tensile (p.s.i.).
E=Ultimate Elongation (percent).

*Example IV*

Piperidinium pentamethylene dithiocarbonate is a very powerful curing accelerator when used in SBR rubber formulations, as shown in Table IV, recipe 1. A short Mooney scorch time is obtained along with a fast cure rate. In recipe 2, 20 wt.-percent of this accelerator was loaded in sodium zeolite X by blending of the two solids. It was found in the recipe 2 test that thermal desorption at vulcanization temperature does not release the active chemical accelerator fast enough, as shown by the poor curing characteristics. The use of $$CaSO_4 \cdot 2H_2O$$

as a displacing agent in recipe 3 gives a fast release of the accelerator at vulcanization temperature and still provides a Mooney scorch time more than twice as long as recipe 1.

TABLE IV

| | Recipe (Parts Per Hundred Parts of Rubber) | | |
|---|---|---|---|
| | 1 | 2 | 3 |
| SBR rubber-carbon black masterbatch | 150 | 150 | 150 |
| Zinc Oxide | 5.0 | 5.0 | 5.0 |
| Stearic Acid | 2.0 | 2.0 | 2.0 |
| Sulfur | 2.0 | 2.0 | 2.0 |
| Piperidinium pentamethylene dithiocarbamate (PPD) | 1.0 | | |
| 20% PPD-80% Zeolite X | | 5.0 | 5.0 |
| $CaSO_4 \cdot 2H_2O$ | | | 5.0 |

| | Minutes to 5 Point Rise | | |
|---|---|---|---|
| Mooney Scorch (MS), 250° F | 6 | 28 | 41 |

| | S | T | E | S | T | E | S | T | E |
|---|---|---|---|---|---|---|---|---|---|
| Press Cure: Minutes at 307° F.: | | | | | | | | | |
| 5 | 3,050 | 3,050 | 300 | 90 | 100 | 600 | 2,150 | 3,479 | 500 |
| 10 | | 3,015 | 265 | 289 | 482 | 700 | 3,005 | 3,736 | 380 |
| Minutes at 320° F.: 2 | 3,437 | 3,841 | 360 | No Cure | | | 862 | 1,559 | 550 |

S = Stress at 300% Elongation (p.s.i.).
T = Ultimate Tensile (p.s.i.).
E = Ultimate Elongation (percent).

Example V

Ethylenediamine loaded in calcium zeolite A powder is a safe curing accelerator for polyacrylate rubbers, as for example ethyl acrylate. The polyamine releases relatively slowly, however, and a slow cure rate is obtained at 320° F. as shown in Table V by the low stress at 300% elongation and ultimate tensile strength obtained with recipe 1. The addition of $Na_2B_4O_7 \cdot 10H_2O$ as a source of water provided a faster rate of cure at 320° F. and a shorter Mooney scorch time at 280° F. This indicates that the water present in the hydrated salt becomes available at these temperatures to function as a release agent for the ethylenediamine curing accelerator.

TABLE V

| Ingredient | Recipe (phr.) | |
|---|---|---|
| | 1 | 2 |
| Ethyl acrylate | 100 | 100 |
| Carbon black | 40 | 40 |
| Stearic Acid | 1 | 1 |
| Benzothiazyl disulfide | 2 | 2 |
| 15% Ethylenediamine-85% Zeolite A | 10 | 10 |
| $Na_2B_4O_7 \cdot 10H_2O$ | | |

| | Minutes to 5 point Rise | |
|---|---|---|
| Mooney Scorch (MS), 280° F | 54 | 18 |

| | Properties After 30 Minutes | |
|---|---|---|
| Press Cure at 320° F.: | | |
| Stress at 300% Elongation (p.s.i.) | 308 | 915 |
| Ultimate Tensile (p.s.i.) | 564 | 1,402 |
| Ultimate Elongation (percent) | 1,200 | 480 |
| Shore A Hardness (units) based on ASTM Standard D-314-52T | 68 | 68 |

Although preferred embodiments of the invention have been described in detail, it is to be understood that modifications and variations may be effected without departing from the spirit and scope of the invention. For example, the invention has been specifically described in terms of active chemicals and a controlled reaction in a reaction zone, but the adsorbate material need not be reactive. For example, aromatic perfumes may be adsorbed in a molecular sieve, stored and subsequently released by contact with a water source at elevated temperatures whereby water is liberated. A similar process may be used to store and release food aromas, as for example coffee aromas from a coffee container.

What is claimed is:
1. A process for curing non-sulfur-modified polychloroprene-based elastomer formulations comprising the steps of adsorbing a curing accelerator within the inner adsorption region of a crystalline zeolitic molecular sieve; providing the elastomer formulation in a reaction zone at below curing temperature; introducing the curing accelerator-containing molecular sieve and a water source into said reaction zone, said water being liberated from the source at elevated temperature below said curing temperature and below the desorption temperature of said curing accelerator; heating said reaction zone to said curing temperature, thereby liberating said water which in turn releases said curing accelerator from the inner adsorption region of said molecular sieve; and reacting the released curing accelerator with said non-sulfur-modified polychloroprene-based elastomer formulation for curing thereof.

2. A urethane reaction process comprising the steps of adsorbing a urethane reaction catalyst within the inner adsorption region of a crystalline zeolitic molecular sieve; providing an organic compound containing a reactive —N=C=G group in which G is a member selected from the group consisting of oxygen and sulfur, and a substance having reactive hydrogen in a reaction zone at below reaction temperature; introducing the urethane catalyst-containing molecular sieve and a water source in said reaction zone, said water being liberated from the source at elevated temperature below said reaction temperature and below the desorption temperature of said urethane reaction catalyst; heating said reaction zone to said reaction temperature, thereby liberating said water which in turn releases the urethane catalyst from the inner adsorption region of said molecular sieve; and catalyzing the urethane reaction.

3. A process for curing butadiene-styrene rubber formulations comprising the steps of adsorbing a curing accelerator within the inner adsorption region on a crystalline zeolitic molecular sieve; providing the rubber formulation in a reaction zone at below curing temperature; introducing the curing accelerator-containing molecular sieve and a water source in said reaction zone, said water being liberated from the source at elevated temperature below said curing temperature and below the desorption temperature of said curing accelerator; heating said reaction zone to said curing temperature, thereby liberating said water which in turn releases said curing accelerator from the inner adsorption region of said molecular sieve; and reacting the released curing accelerator with said butadiene-styrene rubber formulation for curing thereof.

4. A process for curing polyacrylate rubber formulations comprising the steps of adsorbing a curing accelerator within the inner adsorption region of a crystalline zeolitic molecular sieve; providing the rubber formulation in a reaction zone at below curing temperature; introducing the curing accelerator-containing molecular sieve and a water source in said reaction zone, said water being liberated from the source at elevated temperature below said curing temperature and below the desorption temperature of said curing accelerator; heating said reaction zone to said curing temperature, thereby liberating said water which in turn releases said curing accelerator from the inner adsorption region of said molecular sieve; and reacting the released curing accelerator with said polyacrylate rubber formulation for curing thereof.

5. A process according to claim 2 in which dibutyl tin dilaurate is said urethane reaction catalyst, zeolite X is said crystalline zeolitic molecular sieve, and water-containing zeolite X is said water source.

6. A process according to claim 3 in which sulfur is said curing accelerator, zeolite X is said crystalline zeolitic molecular sieve, and $CaSO_4 \cdot 2H_2O$ is said water source.

7. A process according to claim 3 in which piperidinium pentamethylene dithiocarbonate is said curing accelerator, zeolite X is said crystalline zeolitic molecular sieve, and $CaSO_4 \cdot 2H_2O$ as said water source.

8. As a new composition of matter, a stable mixture comprising a urethane formulation comprising an organic compound containing a reactive —N=C=G group in which G is a member selected from the group consisting of oxygen and sulfur, and a substance having reactive hydrogen; a crystalline zeolitic molecular sieve containing a urethane reaction catalyst in its inner adsorption region; and a crystalline zeolitic molecular sieve containing water adsorbate.

9. As a new composition of matter, a stable mixture comprising a butadiene-styrene rubber formulation, a crystalline zeolitic molecular sieve containing a butadiene-styrene curing accelerator in its inner adsorption region, and $Ca_2SO_4 \cdot 2H_2O$.

10. As a new composition of matter, a stable mixture comprising a non-sulfur modified polychloroprene-based elastomer formulation, a crystalline zeolitic molecular sieve containing within its inner adsorption region, a curing accelerator for the elastomer, and $CaSO_4 \cdot 2H_2O$.

11. As a new composition of matter, a stable mixture comprising an ethyl acrylate rubber formulation, a crystalline zeolitic molecular sieve containing within its inner adsorption region, a curing accelerator for such formulation, and $Na_2B_4O_7 \cdot 10H_2O$.

12. A process for curing sulfur-modified polychloroprene-based elastomer formulations comprising the steps of adsorbing a curing agent within the inner adsorption region of a crystalline zeolitic molecular sieve; providing the elastomer formulation in a reaction zone at below curing temperature; introducing the curing agent containing molecular sieve and a water source in said reaction zone, said water being liberated from the source at elevated temperature below said curing temperature and below the desorption temperature of said curing agent; heating said reaction zone to said curing temperature, thereby liberating said water which in turn releases said curing agent from the inner adsorption region of said molecular sieve; and reacting the released curing agent with said sulfur-modified polychloroprene-based elastomer formulation for curing thereof.

13. A urethane reaction process comprising the steps of adsorbing a urethane reaction catalyst containing reactive hydrogen within the inner adsorption region of a crystalline zeolitic molecular sieve; providing an organic compound containing a reactive —N=C=G group in which G is a member selected from the group consisting of oxygen and sulfur, in a reaction zone at below reaction temperature; introducing the urethane catalyst-containing molecular sieve and a water source in said reaction zone, said water being liberated from the source at elevated temperature below said reaction temperature and below the desorption temperature of said urethane reaction catalyst; heating said reaction zone to said reaction temperature, thereby liberating said water which in turn releases the urethane catalyst from the inner adsorption region of said molecular sieve; and catalyzing the urethane reaction.

14. As a new composition of matter, a stable mixture of a urethane formulation comprising an organic compound containing a reactive —N=C=G group in which G is a member selected from the group consisting of oxygen and sulfur; a crystalline zeolitic molecular sieve containing a urethane reaction catalyst in its inner adsorption region, the catalyst having reactive hydrogen; and a crystalline zeolitic molecular sieve containing water adsorbate.

15. A process for curing an epoxy resin formulation comprising the steps of adsorbing a curing agent within the inner adsorption region of a crystalline zeolitic molecular sieve; providing the epoxy resin formulation in a reaction zone at below curing temperature; introducing the curing-agent containing molecular sieve and a water source in said reaction zone, said water being liberated from the source at an elevated temperature below said curing temperature and below the desorption temperature of said curing agent; heating said reaction zone to said curing temperature, thereby liberating said water which in turn releases said curing agent from the inner adsorption region of said molecular sieve; and reacting the released curing agent with said epoxy resin formulation for curing thereof.

References Cited
UNITED STATES PATENTS

| | | |
|---|---|---|
| 2,785,150 | 3/1957 | Kreider et al. |
| 3,018,264 | 1/1962 | Colclough _____ 260—37 |
| 3,036,983 | 5/1962 | O'Connor. |
| 3,242,154 | 3/1966 | O'Conner et al. _____ 264—41.5 |

FOREIGN PATENTS

| | | |
|---|---|---|
| 563,517 | 1/1958 | Belgium. |
| 563,518 | 1/1958 | Belgium. |

OTHER REFERENCES

"'Caged' Accelerators," Chemical & Engineering News, May 26, 1958, pp. 62 and 64, TP 1, I1418.

"Linde Chemical-loaded Molecular Sieves," Bulletin of Union Carbide Corporation, copy received and dated in Div. 60 on Aug. 3, 1959 (11 pages).

"Linde Chemical-loaded Molecular Sieves Bulletin," Linde Co., Division of Union Carbide Corp., Molecular Sieve Products, P.O. Box 44, Tonawanda, New York, TR 7–1600, Mar. 10, 1961 (4 pages).

MORRIS LIEBMAN, *Primary Examiner.*

MILTON STERMAN, *Examiner.*

T. D. KERWIN, A. H. KOECKERT, J. FROME,
*Assistant Examiners.*